United States Patent
Abraham et al.

(10) Patent No.: US 9,961,618 B2
(45) Date of Patent: *May 1, 2018

(54) APPARATUS AND METHOD FOR PERFORMING LOW-POWER GEO-FENCE OPERATIONS

(71) Applicant: Avago Technologies General IP (Singapore) Pte. Ltd., Singapore (SG)

(72) Inventors: Charles Abraham, Los Gatos, CA (US); Frank van Diggelen, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/640,901

(22) Filed: Mar. 6, 2015

(65) Prior Publication Data

US 2015/0181511 A1 Jun. 25, 2015

Related U.S. Application Data

(63) Continuation of application No. 13/679,462, filed on Nov. 16, 2012, now Pat. No. 8,977,288.

(51) Int. Cl.
*H04W 64/00* (2009.01)
*H04W 48/16* (2009.01)
(Continued)

(52) U.S. Cl.
CPC ............ *H04W 48/16* (2013.01); *G01S 5/00* (2013.01); *G06F 1/00* (2013.01); *H04M 1/00* (2013.01);
(Continued)

(58) Field of Classification Search
CPC ........ H04W 64/00; H04W 4/02; H04W 52/02
(Continued)

(56) References Cited

U.S. PATENT DOCUMENTS 7,787,886 B2 * 8/2010 Markhovsky et al. .... 455/456.1
8,977,288 B2 * 3/2015 Abraham et al. ......... 455/456.1
(Continued)

FOREIGN PATENT DOCUMENTS

CN 102449982 A 5/2012

OTHER PUBLICATIONS

Office Action directed to related Chinese Patent Application No. 201310575171.2, dated Aug. 3, 2016; 9 pages.

*Primary Examiner* — Kamran Afshar
*Assistant Examiner* — Farideh Madani
(74) *Attorney, Agent, or Firm* — Sterne, Kessler, Goldstein & Fox P.L.L.C.

(57) ABSTRACT

A geo-fence capable device is disclosed that is capable of performing an accurate geo-fence operation while minimizing power consumption. The device includes sensors, Wi-Fi connectability and GNSS. Sensors intermittently detect whether the device is in motion. When determined to be in motion, Wi-Fi is used to acquire a wireless access point list and to compare the access point list to previously-stored access points in order to determine whether the device is still within a particular region. GNSS is used to confirm exit from a region and to intermittently monitor whether the device has entered a new region. GNSS and application processor use can be minimized by utilizing sensor and Wi-Fi functionality as preliminary region monitors.

20 Claims, 7 Drawing Sheets

(51) Int. Cl.
*H04W 24/00* (2009.01)
*H04W 4/02* (2018.01)
*H04W 52/02* (2009.01)
*H04M 1/725* (2006.01)
*G01S 5/00* (2006.01)
*G06F 1/00* (2006.01)
*H04M 1/00* (2006.01)
*G01S 19/34* (2010.01)
*G01S 19/48* (2010.01)

(52) U.S. Cl.
CPC ......... *H04M 1/72572* (2013.01); *H04W 4/02* (2013.01); *H04W 4/021* (2013.01); *H04W 4/027* (2013.01); *H04W 4/028* (2013.01); *H04W 24/00* (2013.01); *H04W 52/0241* (2013.01); *H04W 52/0254* (2013.01); *H04W 64/00* (2013.01); *G01S 19/34* (2013.01); *G01S 19/48* (2013.01); *H04M 2250/06* (2013.01); *Y02B 60/50* (2013.01)

(58) Field of Classification Search
USPC ....................... 455/456.1–457, 574
See application file for complete search history.

(56) References Cited

U.S. PATENT DOCUMENTS

| | | | |
|---|---|---|---|
| 2007/0288294 A1 | 12/2007 | Olsen et al. | |
| 2009/0045195 A1* | 2/2009 | Djerf | B65D 65/40 220/62.11 |
| 2009/0098880 A1 | 4/2009 | Lindquist | |
| 2010/0130229 A1* | 5/2010 | Sridhara | G01S 19/49 455/456.1 |
| 2011/0250875 A1* | 10/2011 | Huang | H04W 4/02 455/418 |
| 2011/0306304 A1* | 12/2011 | Forutanpour | G06F 3/04883 455/67.11 |
| 2012/0021795 A1* | 1/2012 | Kamibeppu | H04M 1/72572 455/517 |
| 2012/0172039 A1* | 7/2012 | Ko et al. | 455/435.1 |
| 2012/0223835 A1* | 9/2012 | Kuris et al. | 340/539.14 |
| 2012/0282906 A1* | 11/2012 | Frye | H04W 4/04 455/414.2 |
| 2013/0093627 A1 | 4/2013 | Cosman | |
| 2013/0102268 A1* | 4/2013 | Wang | G01S 19/34 455/343.2 |

* cited by examiner

_US 9,961,618 B2_

APPARATUS AND METHOD FOR PERFORMING LOW-POWER GEO-FENCE OPERATIONS

CROSS-REFERENCE TO RELATED APPLICATIONS

This application is a Continuation Application of U.S. application Ser. No. 13/679,462, filed Nov. 16, 2012, which is incorporated by reference herein in its entirety.

FIELD OF INVENTION

The disclosure relates to a device capable of performing efficient geo-fence operations, and more specifically to a mobile device capable of performing geo-fence operations with reduced power consumption.

BACKGROUND

Related Art

Conventional geo-fence applications are currently available for mobile devices, such as cell phones, tablet computers, etc. Geo-fence allows for certain tasks to automatically be performed based on a detected location of the mobile device. For example, when the geo-fence application detects that the mobile device has left a region corresponding to a user's office, the geo-fence application can cause a text message to automatically be sent to a mobile device or computer of the user's family member. Other automatic functions can take place when the geo-fence application detects that the mobile device enters or exits a particular location/region.

Unfortunately, conventional geo-fence applications are impractical due to their large power consumption. Conventional geo-fence applications detect locations by constantly monitoring a location of the device using GNSS signals. Because of the large power consumption of GNSS, using a conventional geo-fence application quickly drains the mobile device's battery. In addition, because GNSS requires line-of-sight with GNSS satellites, geo-fence applications are unable to operate when indoors or otherwise obstructed from communication with GNSS satellites.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

Figure 1:
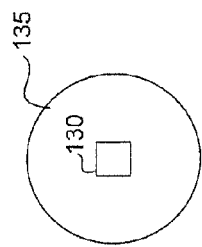
FIG. 1 illustrates a block diagram of an exemplary geo-fence environment.
Figure 1:
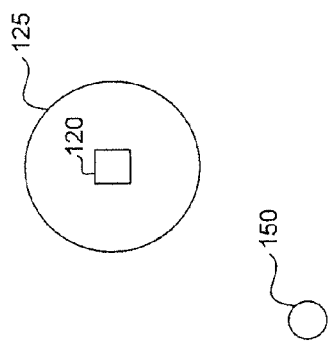
Figure 1:
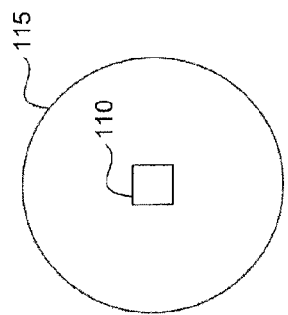

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Further, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the following description is to be described in terms of mobile devices, those skilled in the relevant art(s) will recognize that this description may also be applicable to other electronics devices in which geo-fence or other similar location-dependent applications are performed, without departing from the spirit and scope of the present disclosure.

An Exemplary Geo-Fence Environment

FIG. 1 illustrates a block diagram of an exemplary geo-fence environment 100. The geo-fence environment 100 includes a plurality of locations 110, 120, and 130, having corresponding regions 115, 125, 135 respectively.

A mobile device 150 within the environment 100 may have a geo-fence application that is programmed to perform particular operations when entering and/or leaving one or more of the regions 110/120/130. For example, region 115 may correspond to a user's office building 110, region 125 may correspond to the user's home 120, and region 135 may correspond to the user's school. When leaving region 125, mobile device 150 may notify the user's secretary (by text, email, or other electronic alert) of when the user can be expected to arrive at the office, or entering region 135 can automatically notify the user's child to be ready for pickup, to provide some examples. Another example, may be a region associated with one or more pre-defined retail establishments, such as a grocery store, so that the mobile device can issue an alert to the phone user (e.g. text, sound, light) so as to remind the user of a possible errand. These functions and regions can all be customized and programmed by the user to provide a desired functionality.

Exemplary Mobile Device

Figure 2:
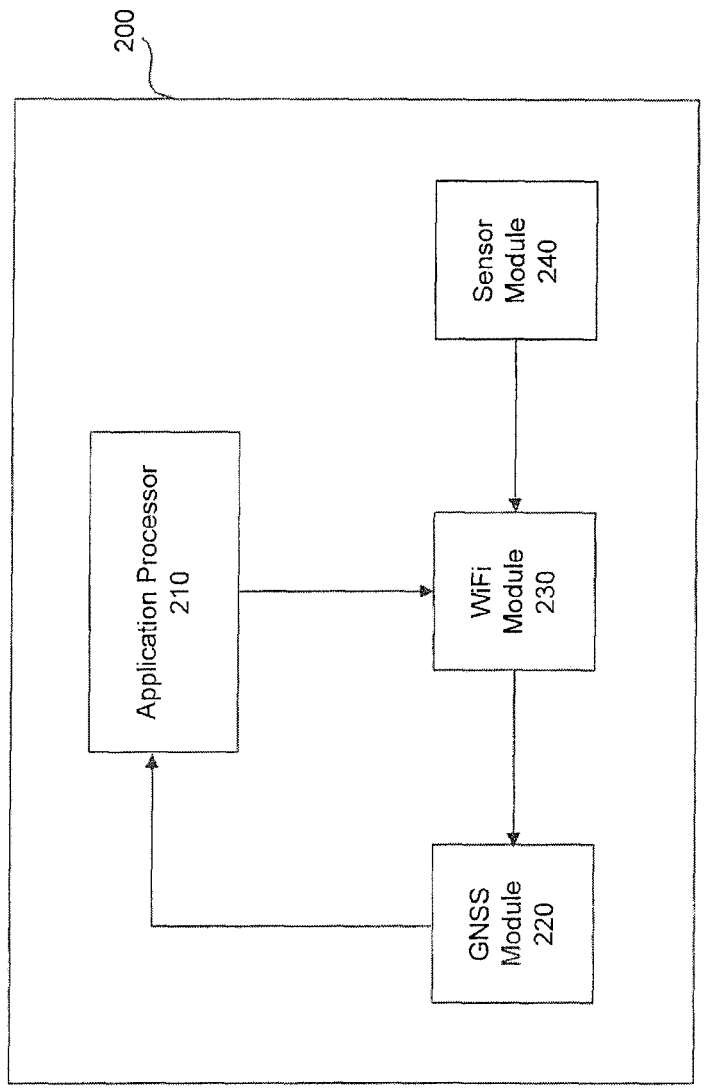
FIG. 2 illustrates a block diagram of an exemplary mobile device.

FIG. 2 illustrates a block diagram of an exemplary mobile device 200 that may be operated within the geo-fence environment 100. The mobile device 200 includes an application processor 210, a GNSS module 220, a Wi-Fi module 230 and a sensor module 240.

In order to perform the geo-fence operation, while also limiting power consumption, the mobile device 200 utilizes the sensor module 240 and the Wi-Fi module 230 in place of the GNSS module 220, when circumstances allow. Each of the Wi-Fi module 230 and the sensor module 240 consume significantly less power, or can be controlled to consume less power, than the GNSS module 220 and/or the application processor 210. The GNSS module 220 and the application processor 210 are only operated at specific times or after specific events in order to reduce their power consumption, and therefore the overall power consumption of the mobile device 200. This is advantageous because the sensor module 240 operates on the order of a few milliamps, while the GNSS module 220 and application processor can require 50-100 milliamps during operation. Accordingly, it desirable to limit the operation of the GNSS module and application processor when possible to extend the battery charge of the mobile device.

In operation, the sensor module 240 detects a motion of the device. Device motion is occasionally monitored by a sensor hub to determine if the motion exceeds a predetermined threshold. Once the detected motion exceeds the predetermined threshold, the sensor hub instructs the Wi-Fi module 230 to perform a scan.

Once the scan instruction is received, the Wi-Fi module 230 performs a scan of the immediate environment in order to detect nearby wireless access point, and thereby acquires a listing a nearby wireless access points. The Wi-Fi module 230 compares the acquired access point listing to a stored history or database to determine an estimation of whether the device has entered/exited any of the regions.

Once the Wi-Fi module 230 has estimated that the mobile device 200 has entered/exited a particular region, the Wi-Fi module 230 instructs the GNSS module 220 to perform a location determination. Once instructed, the GNSS module 220 acquires GNSS signals in order to determine an accurate location of the mobile device 200. The GNSS module 220 determines whether the determined location of the device 200 falls within any of the programmed regions associated with the geo-fence application. If the GNSS module 220 determines that the device 200 has triggered the geo-fence operation (based on the device 200 entering/exiting a particular region), the GNSS module 220 informs the application processor 210, which then performs the function associated with the determined region.

The various components of the mobile device 200, and their corresponding operations, will now be described in further detail with respect to FIGS. 3-5.

Sensor Module

Figure 3:
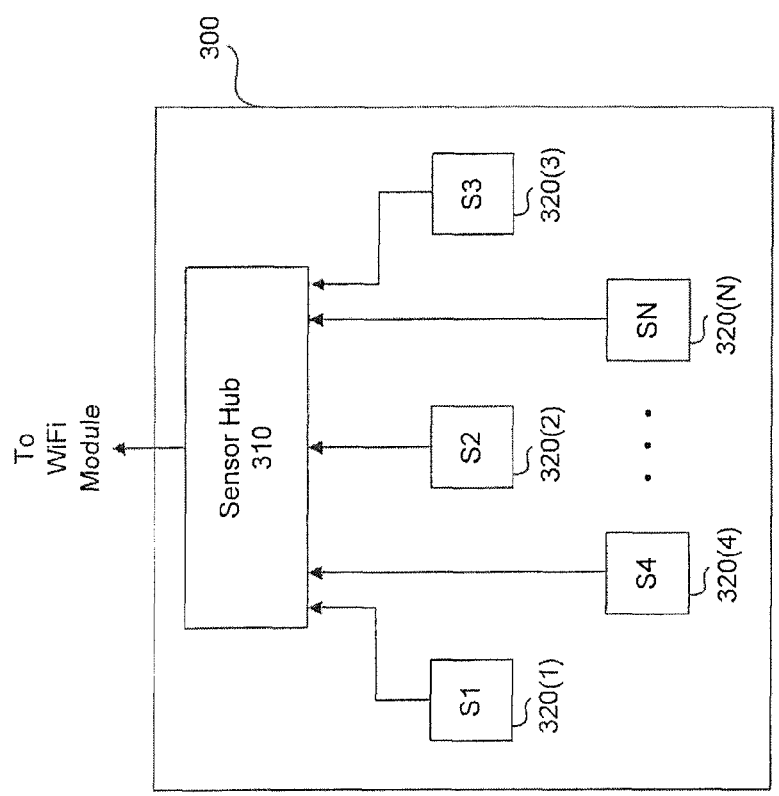
FIG. 3 illustrates a block diagram of an exemplary sensor module that may be included within the mobile device.

FIG. 3 illustrates a block diagram of an exemplary sensor module 300 that may be included within the mobile device 200. The sensor module 300 includes a plurality of sensors 320 and a sensor hub 310, and may represent an exemplary embodiment of the sensor module 240.

The sensor module 300 includes N sensors 320, where N is a positive integer. Each of the sensors 320 may be capable of sensing a different property of the mobile device. For example, sensor 320(1) may be an accelerometer capable of detecting motion of the mobile device 200, and sensor 320(2) may be a gyroscope capable of detecting three-dimensional orientation and/or motion of the mobile device 200. Additional sensors 320(3), 320(4), . . . , and 320(N) may include thermometers, luminometers, among others.

Each of the sensors 320 converts their detected properties to electrical signals indicative of the sensed properties. The sensors 320 forward the electrical signals to a sensor hub 310 that can include a CPU. The sensor hub 310 compares one or more of the sensed signals to corresponding predetermined thresholds that can indicate movement of some kind when a threshold is breached. Therefore, the mobile device is able to determine whether it is in motion or at rest. If the sensor signals are below the predetermined thresholds, the sensor hub 310 takes no further action, as the mobile device is determined to be at rest, and therefore incapable of exiting a current geo-fence or entering a new geo-fence. On the other hand, when the sensor hub 310 determines that one or more sensor signals exceed a predetermined threshold, the sensor hub 310 alerts the Wi-Fi module 230 to perform a scan for access points in the immediate area. In an embodiment, the sensor module 240 also enters a low-power state, once the Wi-Fi module is activated.

In an embodiment, the sensor hub 310 monitors the sensor signals intermittently, and/or with a predetermined frequency (e.g., once every few seconds). This is feasible because it is unlikely that the mobile device will immediately exit a preexisting geo-fence when at rest, given the limits of human movement. Further, it is noted that the lack of reporting or other action(s) by the sensor hub 310 when the mobile device 200 is determined to be at a substantially constant location, results in power saving, as the mobile device would consume unnecessary power to carry out further geo-fence determinations when the mobile device is determined to be at rest.

When other components of the mobile device 200 are operating in the geo-fence application, the sensor module 300 can enter a low-power state to even further reduce application power consumption during this period.

Wi-Fi Module

Figure 4:
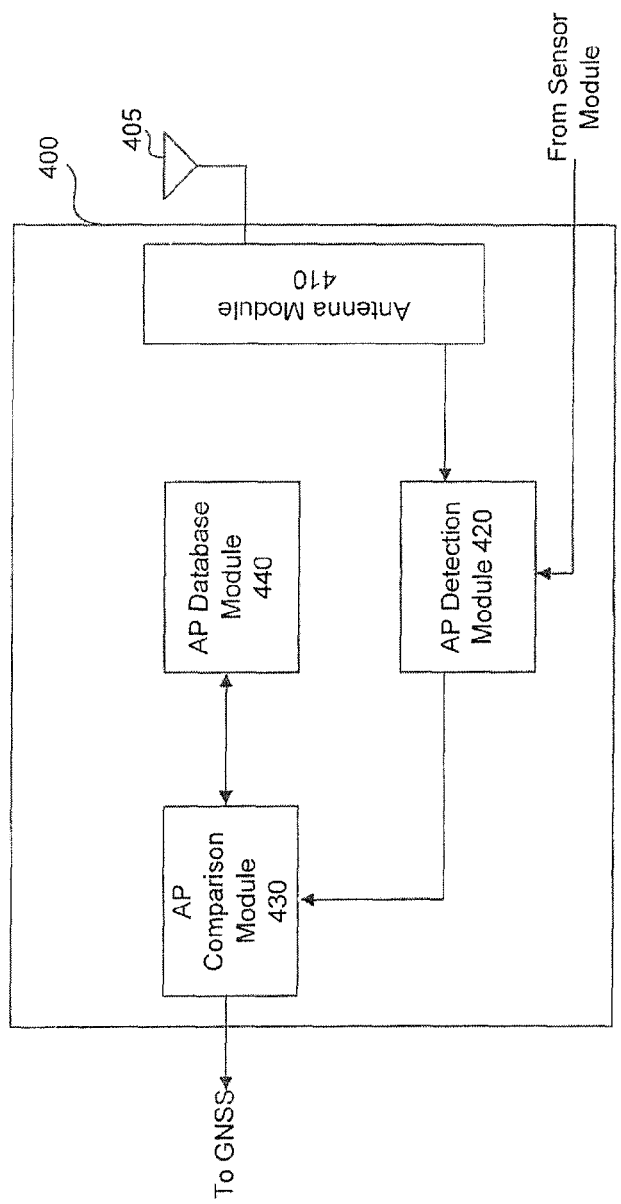
FIG. 4 illustrates a block diagram of an exemplary Wi-Fi module that may be included within the mobile device.

FIG. 4 illustrates a block diagram of an exemplary Wi-Fi module 400 that may be included within the mobile device 200. The Wi-Fi module 400 includes an access point detection module 420, an access point database module 440, and an access point comparison module 430, and may represent an exemplary embodiment of the Wi-Fi module 230. The Wi-Fi module 400 may include one or more CPUs or circuits to implement the various modules.

The access point detection module 420 receives the scan instruction from the sensor module 240. In an embodiment, the Wi-Fi module 230 may operate in a low-power state until receipt of the scan instruction, which causes the Wi-Fi module to transition to an operational state. Upon receipt of the scan instruction, the access point detection module 420 causes an antenna module 410 to receive signals from the environment 100 via its antenna 405. In an embodiment, the scan includes transmitting a request signal to the environment 100 in order to cause nearby wireless access points to transmit response signals that include various identification information (e.g. MAC address) of those wireless access points.

The antenna module 410 receives the response signals via the antenna 405 and forwards them to the access point detection module 420. The access point detection module 420 analyzes the received response signals in order to identify each of the nearby access points that sent response signals to the device 200. Once identified, the access point detection module 420 forwards the access point identification information to the access point comparison module 430. In one embodiment, the access point identification information includes the signal strength of the various response signals, as measured and recorded the antenna module 410. For example, the access point identification information can include a list MAC addresses and their corresponding signal strength as determined during the scan. The cumulative access point identification information for multiple access point measurements may be referred to as the wireless access point signature.

The access point comparison module 430 accesses stored access point information from the access point database module 440. The stored access point information can include access point information stored by the access point comparison module 430 as part of a history or can be stored as specifically corresponding with known regions.

The access point comparison module 430 compares the access point information received from the access point detection module 420 to the stored access point information. Based on the comparison, the access point comparison module 430 can determine whether the mobile device 200 is in motion or still within a particular region. For example, when the stored access point information is stored as a history, the comparison determines whether the device is in motion. Alternatively, when the access point information is stored as part of a regional access point database, the comparison allows for a determination to be made as to whether the device 200 has left a particular region.

If the detected access point information matches access point information stored in the access point database module 440, then the access point comparison module determines that the device 200 is within the region corresponding to the matching stored access point information. The comparison can include comparing previously known access points and their previously measured signal strengths associated with a particular region, with those of a current scan (e.g. current access point signature of the mobile device). If the signal strengths for expected MAC addresses are within expected tolerances, then a region match is determined.

On the other hand, when the access point comparison module 430 determines that the detected access point information no longer matches stored access point information, the access point comparison module 430 determines that the device 200 is in motion and/or has left a designated region. Once the access point comparison module 430 makes this determination, the access point comparison module forwards a notification signal to the GNSS module 220. Upon sending the notification signal to the GNSS module 220, the Wi-Fi module can re-enter a low-power state.

GNSS Module

Figure 5:
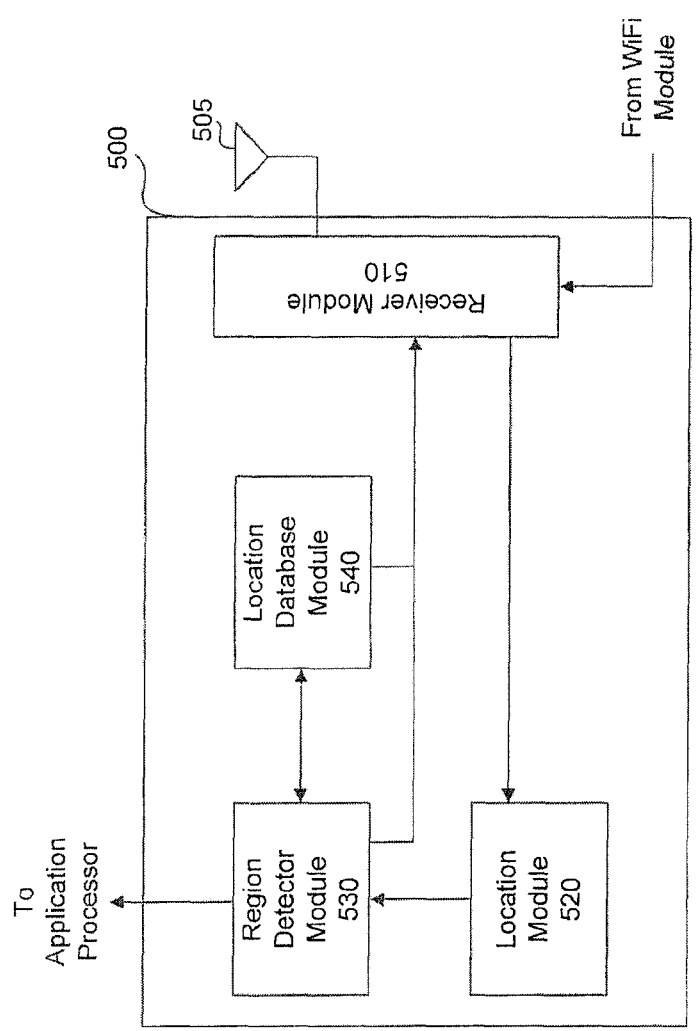
FIG. 5 illustrates a block diagram of a GNSS module that may be included within the mobile device.

FIG. 5 illustrates a block diagram of a GNSS module 500 that may be included within the mobile device 200. The GNSS module 500 includes a location module 520, a region detector module 530, and a location database module 540, and may represent an exemplary embodiment of the GNSS module 220. The GNSS module 500 may include one or more CPUs or circuits to implement the various modules.

A receiver module 510 receives the notification from the Wi-Fi module 400 that the device 200 is in motion or has left the region. In an embodiment, the GNSS module 500 is in a low-power state until receipt of the notification, which causes the GNSS module 500 to transition to an operational state. If the notification identifies motion, the GNSS module 500 determines a location of the device 200 in order to determine whether the device 200 has left the region. Alternatively, if the notification identifies that the device 200 has left the region, the GNSS module 500 determines a location in order to verify the exit from the region, as well as to monitor the pending entrance or approach to a new region, provided that another region has been programmed.

Upon receipt of the notification, a receiver module 510 acquires GNSS satellite information via an antenna 505. The receiver module 510 forwards the satellite information to the location module 520, which uses the satellite information to determine a location of the mobile device 200 using GNSS techniques. The location module 520 forwards the determined location to the region detector module 530.

The region detector module 530 compares the determined location to locations previously stored in the location database module 540 that correspond to the programmed regions. The region detector module 530 can then perform any one of a plurality of functions depending on the comparison.

In a first scenario, the region detector module 530 determines, based on the comparison, that the mobile device 200 has exited a programmed region. In this instance, the region detector module 530 instructs the application processor 210 of the exit from the region in order to allow the application processor 210 to perform any action that has been programmed in association with leaving the region. In addition, the region detector module 530 also controls the receiver module 510 to intermittently perform follow-up signal acquisitions.

In particular, once the device 200 has exited the previous region, the device may now monitor its location in order to determine whether it has entered one of the programmed regions in order to properly perform the geo-fence operation. However, as discussed above, constant operation of the GNSS module 500 consumes significant amounts of power. Therefore, the receiver module 510 can intermittently acquire GNSS satellite information, and operate in a reduced power state when not doing so.

The period with which the receiver module 510 acquires satellite information can be computed based on a distance to a nearest region, as well as other factors, such as speed and direction, for example. In an embodiment, the receiver module 510 acquires a location of a nearest region from the location database module 540. Based on a distance to the nearest region, the receiver module can adjust its signal reception or scanning period. For example, if the nearest region is a large distance from the current location of the device, the receiver module 510 can perform scans once every several minutes. Alternatively, when the nearest region is nearby, the receiver module 510 can scan more frequently. The intervals at which the receiver module 510 scans can be adjusted as the position of the device 200 changes, and can be further adjusted and refined based on direction, speed, etc.

At the scan intervals, the GNSS module 500 performs location identification of the device 200 and compares its current location to stored regions from the location database module 540 in order to determine whether the device has entered any other regions. By scanning intermittently, power consumption can be further reduced.

In another scenario, the region detector module 530 determines that the device 200 has entered a region. In this scenario, the region detector module 530 informs the application processor of the region that has been entered in order to allow the application processor to perform any actions associated with entry of the region. In addition, the GNSS module 500 enters a low-power state. Alternatively, the GNSS module 500 can enter a low-power state upon detecting that the device 200 has reached a substantially rest position, in order to be confident that the device 200 will at least temporarily remain within the region.

Using the above-described configurations of the various components of the mobile device 200, the geo-fence process can be performed using "host-offload," in which the application processor 210 is only used at needed intervals. Similarly, the operation of the GNSS module 220 is also reduced. This allows accurate geo-fence processing to occur, while minimizing power consumption and extending battery life.

Exemplary Method for Performing a Geo-Fence Process

Figure 6:
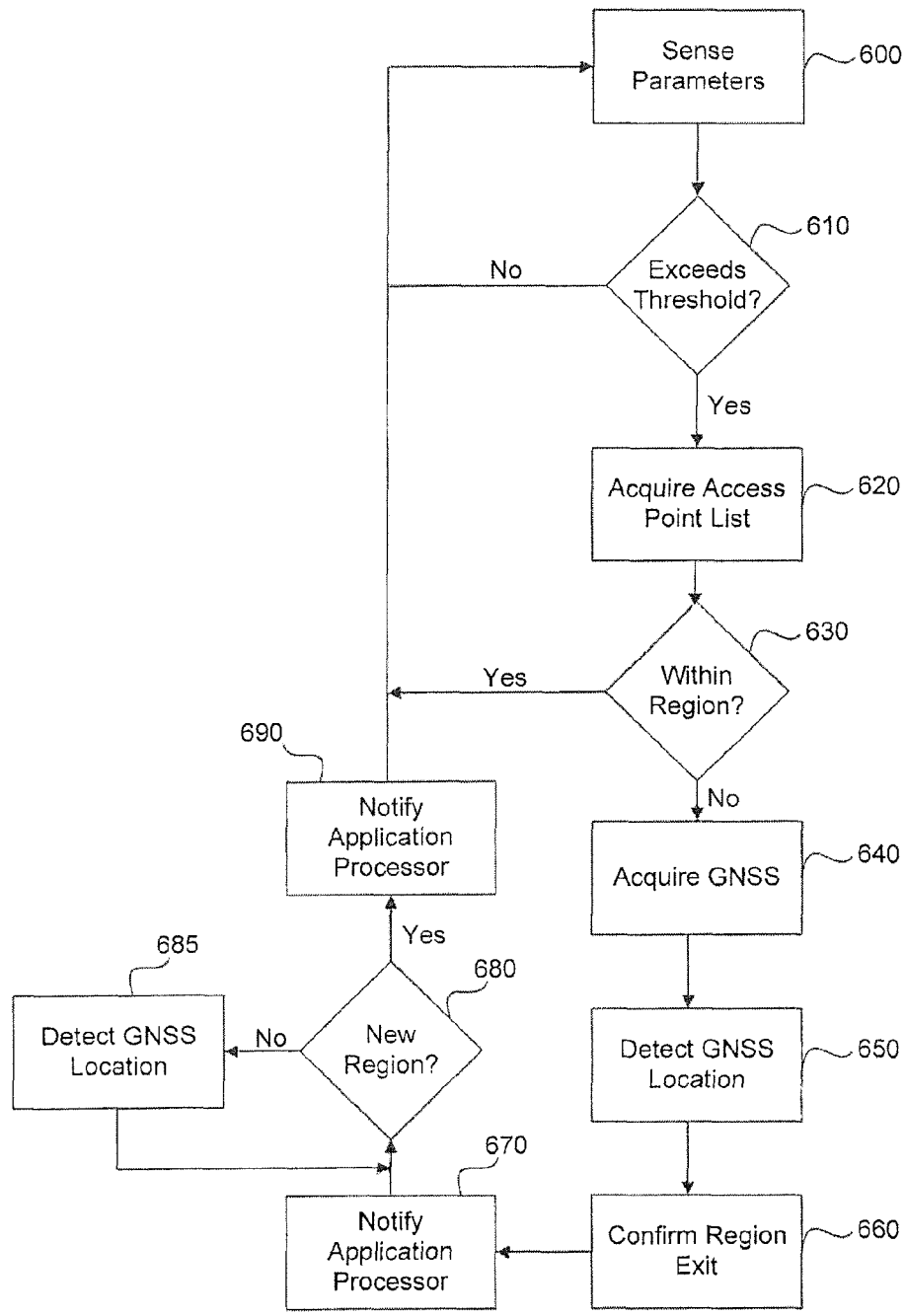
FIG. 6 illustrates a block diagram of an exemplary method for performing a geo-fence operation.

FIG. 6 illustrates a block diagram of an exemplary method for performing a geo-fence operation within a mobile device.

Initially, the mobile device utilizes one or more sensors to sense parameters relating to the device (600). The mobile device compares the sensed parameters to one or more predetermined thresholds (610) in order to determine if the device is in motion. If the parameters do not exceed the thresholds (610—N), the device determines that it is not in motion and returns to sensing parameters (600). Alternatively, if the device determines that the sensed parameters do exceed the thresholds (610—Y), the device acquires a list of wireless access points (620) by scanning the environment for wireless access points that can be detected, and noting the identification (e.g. MAC address) of the detected access points.

By comparing the acquired list of wireless access points to stored access point identification information, the device is able to determine whether it is still within its original region (630). If the device is still within the original region (630—Y), the device returns to sensing parameters (600). Alternatively, if the device determines that it has exited its original region (630—N), the device acquires GNSS satellite information (640).

Based on the acquired GNSS satellite information, the device calculates its location (650) in order to confirm that it has exited the original region (660). Provided that the calculated location indicates that the device has exited the region, the device sends a notification to its application processor (670) in order to carry out any geo-fence operations associated with the exit from the original region.

Once the application processor has been notified, the device determines whether it has entered a new region associated with the geo-fence application (680). If the device has not entered a new region (680—N), the device continues to intermittently acquire GNSS satellite information and determine a location of the device (685). The frequency with which the device acquires GNSS information can be varied based on distance to a nearest region, as well as other parameters. For example, the frequency of GNSS signal acquisition may be increased as the device gets closer to entering a new region. When beyond threshold distance, the frequency of GNSS signal acquisition may be reduced, where the GNSS module may be powered down or put in a low power state, thereby improving battery life of the mobile device.

Once the device has detected that it has entered a new region (680—Y), the device notifies the application processor (690) in order to allow the application processor to carry out any operations associated with entry into the new region. Also, once the device has re-entered a geo-fence region, the device can return to sensing parameters in order to detect motion of the device (600). This return to sensing parameters can occur after a predetermined time period or after the device determines that it is likely to at least temporarily remain within the region. This determination can be made based on a rate of change of the device's location, a time spent within the region, time-of-day, and prior known usage. For example, if it is a weekday, past a certain time, and the device has entered a "home" region, the device may expect to remain within this geo-fence for an extended period and therefore, rely on sensor parameters to detect any movement toward exiting the existing region.

Those skilled in the relevant art(s) will recognize that the above method can additionally or alternatively include any of the functionality of the mobile device 200 discussed above, as well as any of its modifications. Further, the above description of the exemplary method should neither be construed to limit the method nor the description of the mobile device 200.

Second Exemplary Mobile Device

The priority of operation of the GNSS module 220, the WiFi module 230 and the sensor module 240 need not be set in the manner described above with respect to the mobile device 200. In other words, similar power-saving benefits can still be achieved by operating the GNSS module 220, the WiFi module 230 and the sensor module 240 in an order other than that previously described.

For example, in an embodiment, the GPS module 220 can be set as the primary module for determining position of the mobile device 200. When the GPS loses signal, or when a battery of the mobile device 200 falls below a threshold, the mobile device can then transition to using the WiFi module 230 and/or the sensor module 240 to determine and track location.

Other priorities may also be set. For example, any of the GNSS module 220, WiFi module 230 and sensor module 240, or any combination thereof can be set as the primary module for tracking location and/or movement of the mobile device 200. Transitions from the primary module to any of the remaining modules, as well as transitions between the remaining modules, can occur based on any number of conditions, including remaining battery life, whether the current module is able to properly function, movement, speed, location, signal strength, etc.

Further, the mobile device 200 can include a programmable control module (not shown) to allow for customization of this configuration. The programmable control module can be configured to be programmed by a user with a defined configuration. The programmable control module is configured to control each of the GNSS module 220, the WiFi module 230 and the sensor module 240 in accordance with the defined configuration, monitor statuses of those modules to determine when transition conditions have been met, and control the various module to implement those transitions. In this manner, the mobile device 200 becomes flexible and customizable.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 7:
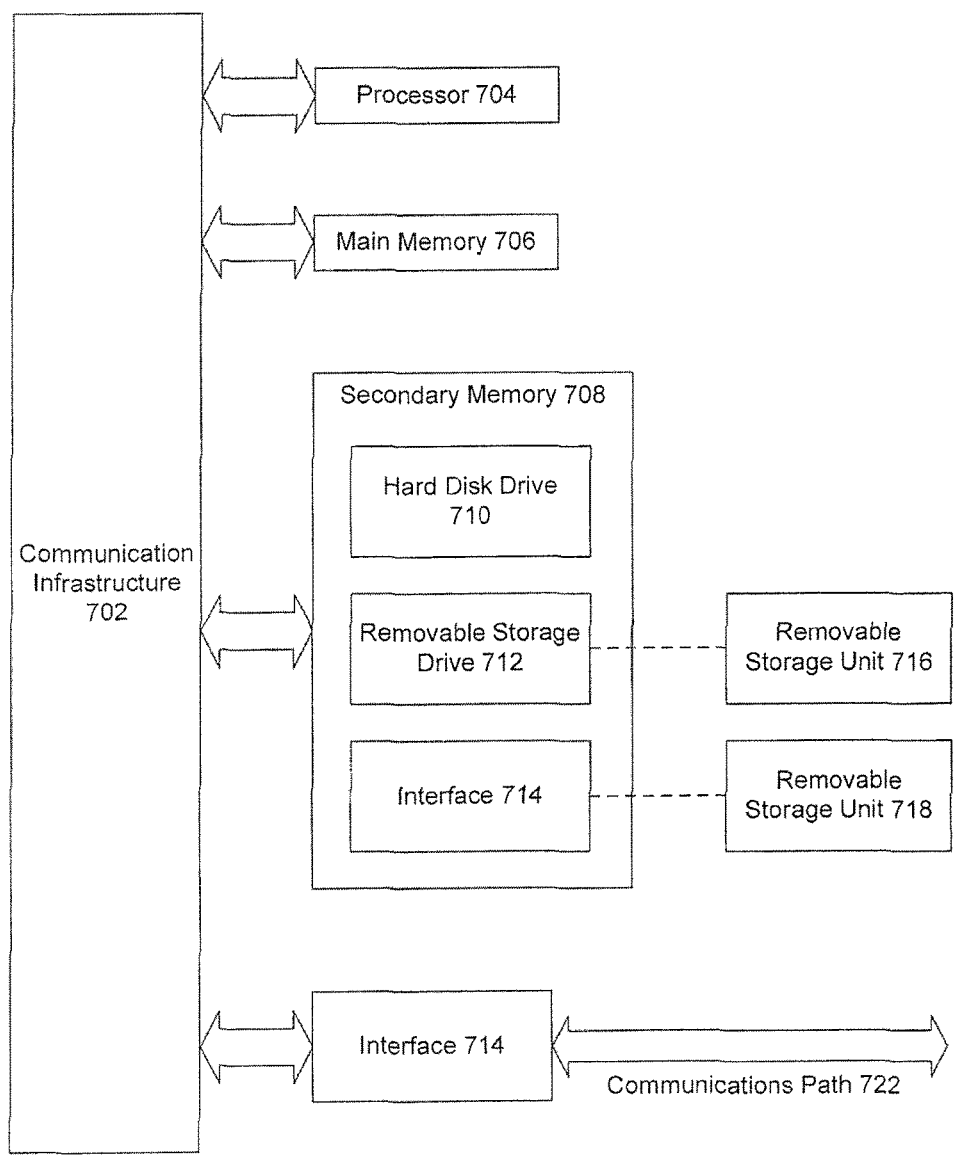
FIG. 7 illustrates a block diagram of an exemplary general purpose computer system.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 700 is shown in FIG. 7. One or more of the modules depicted in the previous figures can be at least partially implemented on one or more distinct computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCM-CIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A mobile device, the mobile device comprising:
   a sensor module configured to detect a parameter indicative of spatial motion of the mobile device; and
   a wireless local area network (WLAN) module configured to determine whether the mobile device is within a geo-fence region based on access point identification information in response to the spatial motion being detected by the sensor module,
   wherein the sensor module is configured to detect the spatial motion when the detected parameter exceeds a predetermined threshold,
   wherein the WLAN module is further configured to transition from a low-power state to an operational state in response to the sensor module determining that the mobile device has transitioned from being at rest to being in spatial motion,
   wherein the sensor module enters the low-power state after the transition to spatial motion is detected, and
   wherein the WLAN module enters the low-power state after determining that the mobile device is outside the geo-fence region.

2. The mobile device of claim 1, wherein the WLAN module is configured to determine whether the mobile device is within the geo-fence region by acquiring the access point identification information from nearby access points and comparing the access point identification information to previously-stored access point identification information.

3. The mobile device of claim 2, wherein the previously-stored access point identification information is stored in association with the geo-fence region, and
   wherein the previously-stored access point identification information is part of an access point history.

4. The mobile device of claim 1, wherein the sensor module includes a plurality of sensors coupled to a sensor hub, wherein the sensor hub is configured to transmit an instruction signal to the WLAN module in response to the sensor module detecting the transition to spatial motion.

5. The mobile device of claim 1, further comprising an application processor configured to automatically perform a geo-fence operation based on the determination by the WLAN module.

6. The mobile device of claim 1, wherein the WLAN module is further configured to transition from the operational state to the low-power state in response to the WLAN module determining that the mobile device is outside the geo-fence region.

7. A mobile device within a mobile communication environment, comprising:
   a sensor module configured to determine whether the mobile device is in spatial motion based on a sensed parameter;
   a wireless local area network (WLAN) module configured to determine whether a current location of the mobile device is within a geo-fence region in response to the sensor module determining that the mobile device has transitioned from a rest state to being in spatial motion,
   wherein the sensor module is configured to transmit a notification signal to the WLAN module upon determining that the mobile device has transitioned to spatial motion, wherein the notification signal causes the WLAN module to transition from a low-power state to an operational state,
   wherein the WLAN module is further configured to transition from the low-power state to the operational state in response to the sensor module determining that the mobile device has transitioned from being at rest to being in spatial motion,
   wherein the sensor module enters the low-power state after the transition to spatial motion is detected, and
   wherein the WLAN module enters the low-power state after determining that the mobile device is outside the geo-fence region.

8. The mobile device of claim 7, wherein the WLAN module performs the determination based on a wireless access point signature of the mobile communication environment detected at the current location of the mobile device.

9. The mobile device of claim 7, wherein the sensor module is configured to intermittently monitor the sensed parameter.

10. The mobile device of claim 7, wherein the WLAN module transitions from the operational state to the low-power state in response to the WLAN module determining that the mobile device is outside the geo-fence region.

11. The mobile device of claim 8, wherein the wireless access point signature includes access point identifiers of nearby access points.

12. The mobile device of claim 11, wherein the wireless access point signature further includes signal strengths corresponding to the nearby access points.

13. A mobile device, comprising:
   a wireless local area network (WLAN) module configured to transition from a low-power state to an operational state in response to a sensor module detecting that the mobile device has transitioned from a rest state to being in spatial motion based on a sensed parameter, to determine whether the mobile device is within a geo-fence region based on access point identification information in response to the spatial motion being detected by the sensor modules and to transition from the operational state to the low-power state after determining that the mobile device is outside the geo-fence region; and
   a global navigation satellite system (GNSS) module configured to confirm that the mobile device is outside the geo-fence region, and to track a location of the mobile device based on GNSS satellite signals, in response to the WLAN module determining that the mobile device is outside the geo-fence region,
   wherein the sensor module enters the low-power state after the transition to spatial motion is detected.

14. The mobile device of claim 13, wherein the WLAN module is configured to make the determination while operating in the operational state, and
   wherein the WLAN module is configured to enter the low-power state when the mobile device is determined to be outside the geo-fence region.

15. The mobile device of claim 13, wherein the WLAN module is configured to transmit a notification signal to the GNSS module upon determining that the mobile device is outside of the geo-fence region, and
wherein the GNSS module is configured to transition from the low-power state to the operational state upon receipt of the notification signal.

16. The mobile device of claim 13, wherein a frequency with which the GNSS module monitors the location of the mobile device is adjusted based on a distance from the location of the mobile device to a nearest geo-fence region, and
wherein the frequency with which the GNSS module monitors the location increases as the distance from the location of the mobile device to the nearest geo-fence region decreases.

17. The mobile device of claim 13, wherein a frequency with which the GNSS module monitors the location of the mobile device is adjusted based on speed, distance to a nearest other geo-fence region, or direction of motion.

18. The mobile device of claim 13, wherein the WLAN module is configured to perform the determination by comparing access point identification information of nearby wireless access points to stored access point identification information of access points associated with the geo-fence region.

19. A mobile device, comprising:
a sensor module configured to detect a parameter indicative of spatial motion of the mobile device; and
a wireless local area network (WLAN) module configured to determine whether the mobile device is within a geo-fence region based on access point identification information in response to the spatial motion being detected by the sensor module,
wherein the sensor module is configured to detect the spatial motion when the detected parameter exceeds a predetermined threshold,
wherein the sensor module enters a low-power state after the spatial motion is detected, and
wherein the WLAN module enters the low-power state after determining that the mobile device is outside the geo-fence region.

20. The mobile device of claim 19, wherein the WLAN module is configured to determine whether the mobile device is within the geo-fence region by acquiring the access point identification information from nearby access points and comparing the access point identification information to previously-stored access point identification information.

* * * * *

UNITED STATES PATENT AND TRADEMARK OFFICE
CERTIFICATE OF CORRECTION

PATENT NO. : 9,961,618 B2
APPLICATION NO. : 14/640901
DATED : May 1, 2018
INVENTOR(S) : Abraham et al.

Page 1 of 1

It is certified that error appears in the above-identified patent and that said Letters Patent is hereby corrected as shown below:

In the Claims

In Column 12, Line 50, replace "sensor modules and" with --sensor module, and--.

Signed and Sealed this
Fourth Day of June, 2019

Andrei Iancu
*Director of the United States Patent and Trademark Office*